United States Patent [19]
Prohaska

[11] Patent Number: 5,201,111
[45] Date of Patent: Apr. 13, 1993

[54] METHOD OF MANUFACTURING AN ELECTRIC MOTOR

[75] Inventor: Hans Prohaska, Bietigheim-Bissingen, Fed. Rep. of Germany

[73] Assignee: SWF Auto-Electric GmbH, Fed. Rep. of Germany

[21] Appl. No.: 659,369
[22] PCT Filed: Jul. 14, 1990
[86] PCT No.: PCT/EP90/01158
§ 371 Date: Mar. 19, 1991
§ 102(e) Date: Mar. 19, 1991
[87] PCT Pub. No.: WO91/01588
PCT Pub. Date: Feb. 7, 1991

[30] Foreign Application Priority Data
Jul. 20, 1989 [DE] Fed. Rep. of Germany ....... 3923974

[51] Int. Cl.⁵ ............................................. H02K 15/14
[52] U.S. Cl. .................................... 29/596; 29/527.4; 310/42; 310/45; 310/89; 310/154
[58] Field of Search ...................... 29/596, 598, 527.2, 29/527.4; 310/42, 43, 45, 89, 156, 154

[56] References Cited
U.S. PATENT DOCUMENTS
2,971,107  2/1961  Jin ..................... 310/156 X Primary Examiner—Carl E. Hall
Attorney, Agent, or Firm—Robert P. Seitter; J. Gordon Lewis

[57] ABSTRACT

A method of manufacturing an electric motor for a windshield wiper of motor vehicles is described, in which magnets are held on the housing case by way of an adhesive connection. Thereby the magnet, together with the adhesive, is inserted into the housing case, before said housing case is coated with powder under heat supply. Thereby the heat supplied for coating the housing case with powder is simultaneously used for hardening the melting adhesive.

11 Claims, 2 Drawing Sheets

METHOD OF MANUFACTURING AN ELECTRIC MOTOR

INTRODUCTION

The present invention relates to a method of manufacturing an electric motor, especially an electric motor for driving windshield wipers of motor vehicles.

BACKGROUND OF THE INVENTION

Normally, electric motors used in windshield wipers of motor vehicles comprise a housing with a metallic housing case which is bent or rolled from a metal blank. Thereby as to some manufacturing methods the metal blank is bent around the bottom when rolling the housing case, whereby holding means on the bottom and holding means on the metal blank engage one after the other. Thus, when the metal blank is bent, the bottom of the motor housing is fixed at the same time. As to other manufacturing methods first of all the metal blank is bent in the shape of a pipe-like housing case and only in a subsequent operational step the housing bottom or housing lid is fixed onto this housing case.

Then in most of the windshield wiper motors the housing case is coated with a cover serving as protection against corrosion and ensuring, furthermore an improved radiation of heat. For this purpose in some cases, a black baking varnish is put on. In other cases the housing case is coated with a powder. In both cases heat has to be supplied in this operational step so that the cover is of the necessary hardness and constancy. As to the powder coating for example, first of all the housing is heated by hot air, then the material is put on and finally the housing is kept at higher temperature until the coating powder is hardened.

Then the magnets are fixed onto the housing provided with such a varnished or coated cover. For this purpose normally resilient clamps riveted with the housing case are used.

Already for reasons of tolerance the outer contour of the magnet cannot exactly be in accordance with the contour of inner surface of the housing case. Therefore the magnet is dimensioned in such a way that it lies only on those border areas on the inside of the housing case, on which it is held by the resilient clamps, whereby in the middle angle area of the segment-like magnet a gap towards the housing case remains. In most cases this gap is filled by a varnish put on afterwards. Thus unwanted noises caused by vibrations of the magnet which is resiliently supported shall be avoided.

Wiper motors manufactured according to this method have proved very worthwhile in practice to a large extent. However, it must be noted that assembling the magnets with riveted resilient clamps causes problems and that automatizing this operational step is only possible under great efforts. Besides, there are relatively big deviations of tolerance, and an unduely big number of noises caused by vibrations cannot totally be excluded despite the varnish filled into the gap.

BRIEF DESCRIPTION OF THE INVENTION

Therefore the object of the present invention is to simplify the method of manufacturing such an electric motor and to improve it in such a way that disturbing noises are avoided to a large extent.

Thereby the invention is based on the idea that, when fixing the magnets by way of a melting adhesive, the magnets can be linked better with the housing case and consequently, noises of vibrations can be avoided. Thereby the manufacturing costs are not increased, if according to an essential feature of the present invention the heat necessary for hardening the melting adhesive is not supplied in a separate operational step, but if the magnets are inserted into the housing already before putting on the cover and if then the heat necessary, for instance for burning in the varnish is also used for hardening the melting adhesive.

Thus this method essentially differs from a known manufacturing method in which the magnets are also stuck onto the housing case, especially held onto it by way of an adhesive foil. In this known method a high frequency coil is put over the housing and the adhesive is cross-linked via high electricity heating. After this relatively short process the foil is finally hardened in a heat forced-air oven. In this known method it is not thought of using the heat supply for hardening the adhesive as well using it for the coating.

According to an advantageous development of the invention the melting adhesive is put onto the outer surface of the magnet. Then this magnet provided with the melting adhesive is inserted into the housing. Since in this state the melting adhesive is still relatively viscoplastic, it serves as a distance holder between the magnet and the inside of the housing case. Therefore the housing, the housing case of which is mostly covered with a greasy film due to the deforming process when manufacturing it, can be washed together with the assembled magnet in an appropriate solvent because due to this gap the solvent can reach the total inner surface of the housing case without any difficulties. This is important because only thus it can be ensured that there is a perfect adhesive connection with the adhesive melting because of the heat supply. Washing out the motor housing after the assembly of the magnets is especially of an advantage because immediately afterwards it can be coated and consequently, there is less danger of making the housing case dirty again in further operational steps.

BRIEF DESCRIPTION OF THE DRAWINGS

The invention is described by means of the embodiment illustrated in the drawing, in which.

DETAILED DESCRIPTION OF THE INVENTION

Figure 1:
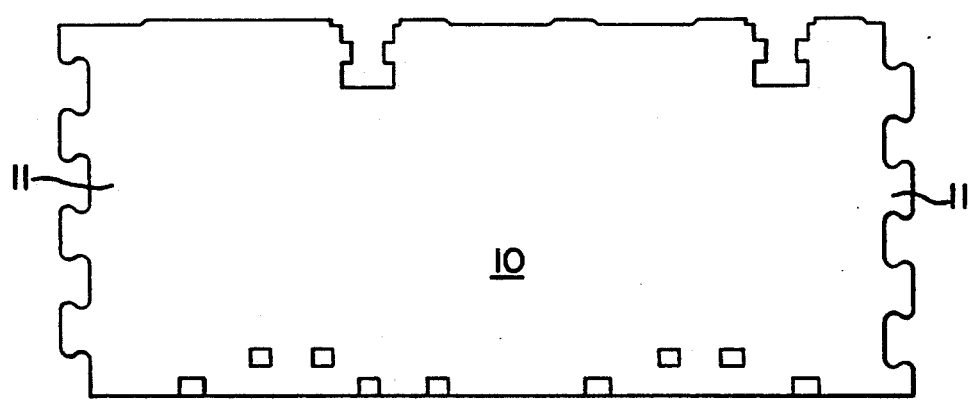
FIG. 1, is a lateral view of a metal blank.
Figure 2:
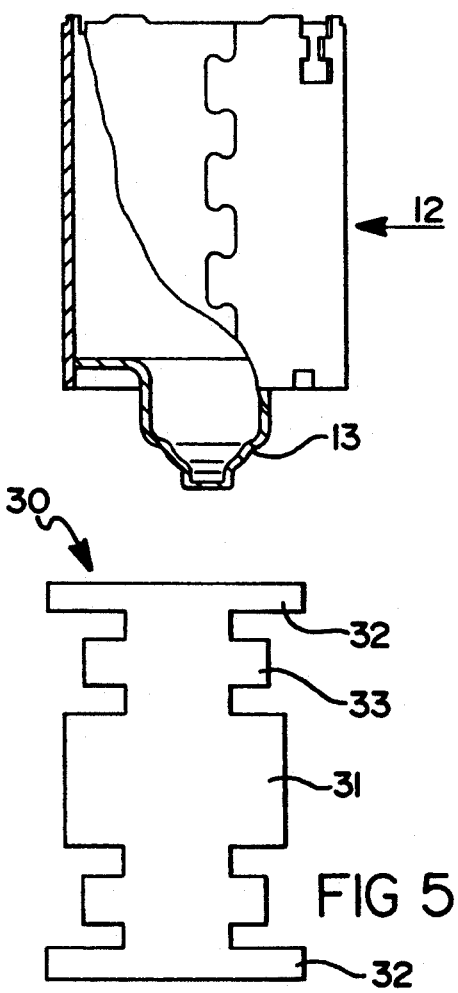
FIG. 2, is a lateral view of a motor housing member.

In FIG. 1 a metal blank designated by 10 is illustrated, which metal blank 10 comprises a toothing 11 each on the narrow sides, whereby these toothings engage into each other after the metal blank has been rolled, as it is made clear in FIG. 2. A bearing lid 13 is fixed into this cylindrical or pipe-like housing case 12. In the illustrated embodiment bearing lid 13 is inserted into the housing case 12 after the metal blank 10 has been bent, however, there are also manufacturing methods in which the metal blank 10 is bent around this bearing lid 13 so that this pot-like housing according to FIG. 2 is manufactured in one operational step. However, the way this housing is manufactured is not of special importance to the present invention so that further explanations need not be given.

Figure 3:
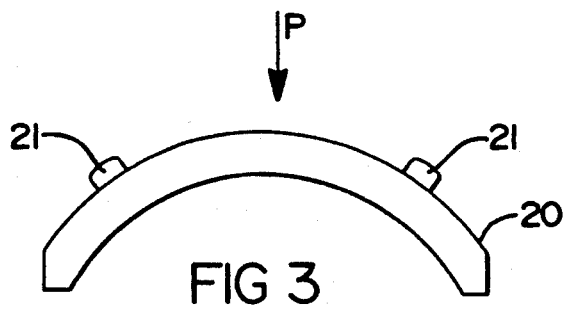
FIG. 3, is a front view of a magnet.
Figure 4:
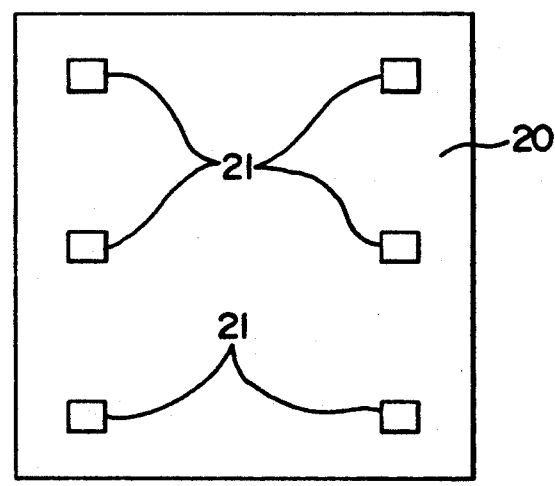
FIG. 4, is a view in the direction of arrow P of the magnet.

In the FIGS. 3 and 4 a ring-segment-like magnet 20 is illustrated, which magnet 10 is inserted into the housing later on and is fixed on the inside of the housing case. FIGS. 3 and 4 indicate that a melting adhesive is put onto these magnets at some points, whereby the adhesive points are designated by 21. In FIG. 4 six adhesive points 21 of this sort are indicated, which points 21 are situated close to the lateral edge of the magnets. Instead of separate adhesive points 21 adhesive lines could also be provided.

Figure 5:
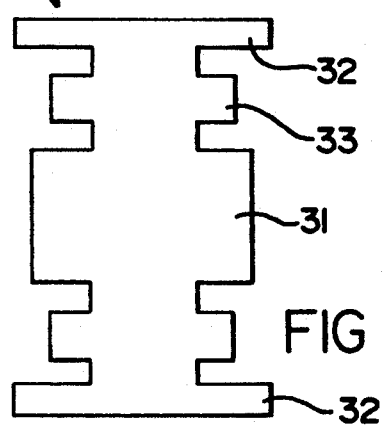
FIG. 5, is a view of a resilient clamp.
Figure 6:
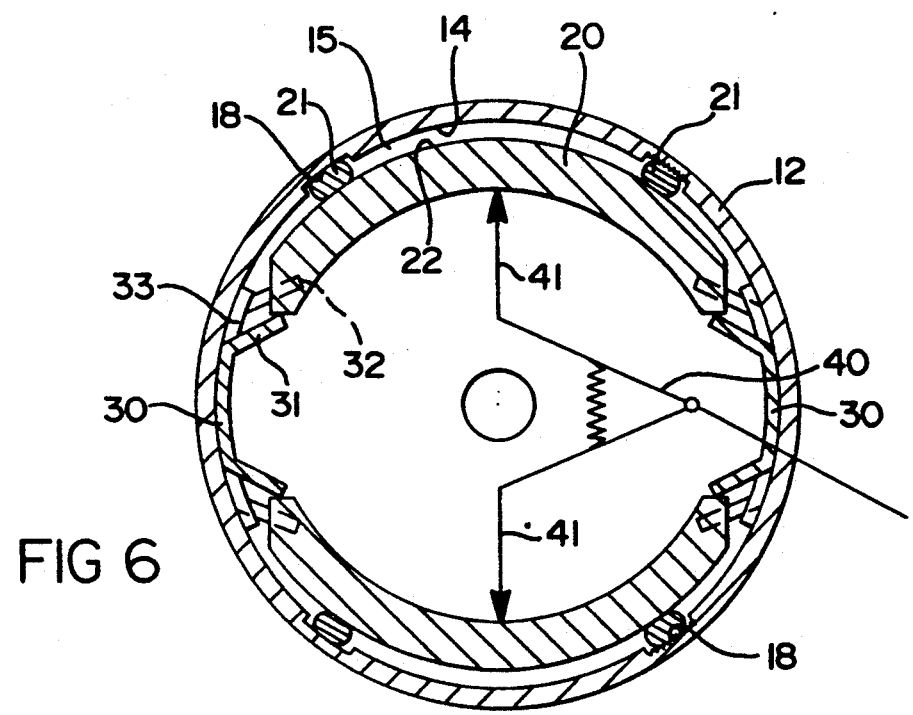
FIG. 6, is a section of the electric motor before the heat supply and the coating.

The magnets prepared according to the FIGS. 3 and 4 are inserted into the housing, as it can been seen in FIG. 6. Thereby resilient clamps 30 serve as position securing elements for the magnets 20, which are arranged in circumferential direction between the front sides of these magnets 20 and which radially push the magnets against the housing case 12 due to the force of respective resilient tabs 31. Differing from the known embodiments on the axial front faces on both sides each the resilient clamps illustrated in FIG. 5 comprise two stops 32 sticking out so that thus the position of the magnets 20 is ensured in the axial direction of the housing into both directions. Thereby, however, these adhesive points 21 of this melting adhesive first of all act as distance holders so that a narrow gap 15 is left between the outer surface 22 of the magnet and the inside 14 of the housing case. This gap 15 is illustrated in an exaggerated manner in FIG. 6 for reasons of clearness. FIG. 6 shows that these resilient clamps 30 are not riveted with the housing case. These resilient clamps are held in circumferential direction exclusively by urging them towards the magnets. Thereby it is of importance that the resilient tabs 31 lie on the magnets 20 in such a way that no essential force component is produced into radial direction towards the center of the housing because otherwise, the resilient clamps could be loosened. However, in order to guarantee a secure hold of these resilient clamps in any case, securing tabs 33 are provided, which partly engage into an area between the magnets 20 and the inside 14 of the housing case 12, as it is made clear in the FIGS. 6 and 7.

Besides, FIG. 6 makes clear that on the inside 14 of the housing case 12 recesses 18 are punched out, which recesses 18 are arranged at such points into which the melting adhesive 21 can engage. Punching out these recesses 18 is preferably done at the same time as punching out the metal blank illustrated in FIG. 1, in any case, however, it is done before the bending process.

The resilient clamps 30 exert—as already mentioned—radial pressure, by which the magnets 20 are supported on the inside 14 of the housing case 12 via the melting adhesive 21. If in some cases this pressure is not sufficient, as an assembly aid an expanding device 40 only schematically shown in FIG. 6 can be provided as a position securing element for the magnets 20. Thus this expanding device 40 is to comprise clamping jaws 41 only schematically illustrated, which clamping jaws 41 are resiliently supported against each other, are urged in radial direction towards the outside and which exert additional pressure onto the two magnets 20 when the melting adhesive is hardening.

Figure 7:
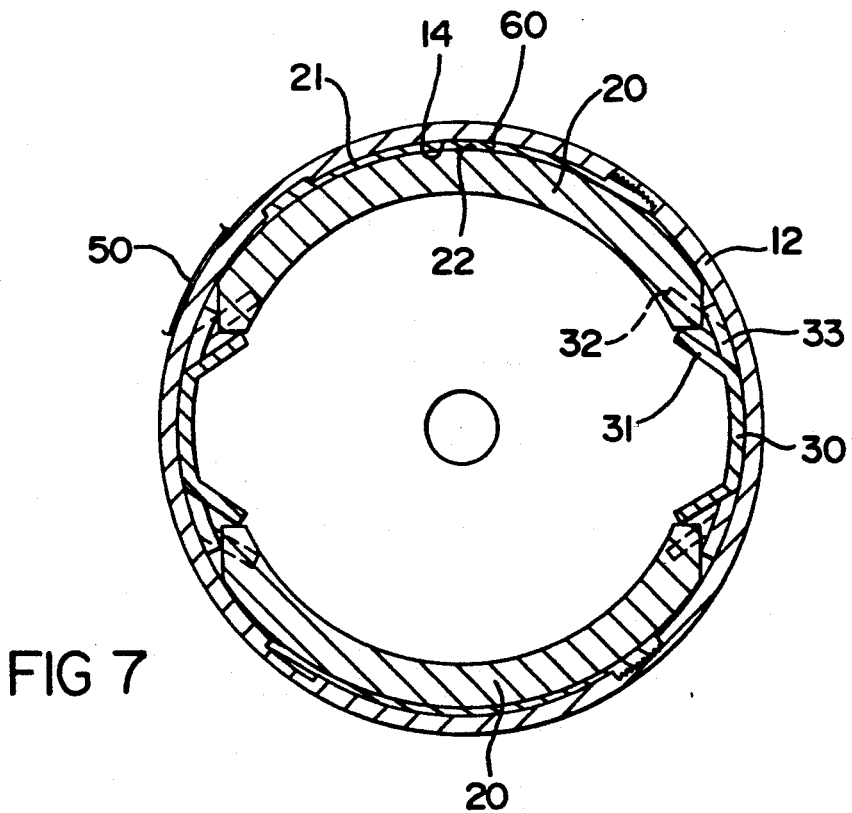
FIG. 7, is a section of the motor after the hardening of the adhesive and the coating.

Then the unit according to FIG. 6 is washed in an appropriate solvent, whereby the solvent also reaches the inside of the housing case 12 without difficulties because in this state there is still a gap between this inside 14 and the outer surfaces 22 of the magnets. After this washing out process the unit according to FIG. 6 is provided in a known manner with a cover 50, only a section of which is illustrated in FIG. 7 in an exaggerated manner. For this purpose this unit according to FIG. 6, that is the housing with the magnets 20 inserted into it, is heated for example by warm air. Then the housing case is coated with a respective powder or a baking varnish and finally this unit undergoes a longer heat treatment so that this cover 50 gets the necessary constancy. During this heat treatment the melting adhesive is liquefied and then, on the one hand, flows into these recesses 18, on the other hand, also flows into the gap 60 caused by possible tolerances or provided on purpose by respective dimensioning, which gap 60 is between this outer surface 22 on the magnet 20 and the inside 14 on the housing case 12, as it can be seen in FIG. 7 showing the housing case after the heat treatment. Thus it is made clear that this melting adhesive 21 is spread extensively. It fills the gap or empty space 60 otherwise filled with varnish. Thereby it is not absolutely necessary to fill it totally because vibrating motions between these elements and thus noises of vibration, too, are practically excluded due to the adhesive connection withstanding big abrasions between the magnets and housing case.

Finally it must be noted that the basic idea of the present invention can, of course, also be realized in housings comprising a housing pot deep-drawn from a metal blank. It is also not absolutely necessary that resilient clamps are used as position securing elements. For example for securing the position only an expanding device could be used as an assembly aid. The invention is not at all restricted to one embodiment either in which this melting adhesive is only put onto the magnet at certain points. A foil with a melting adhesive cover could also be used. It is not absolutely necessary either to put the melting adhesive onto the outsides of the magnet, however, such a method is preferred because this melting adhesive also sticks without heat supply. This would not be given on the housing case still coated with a greasy film, if the washing process is carried out only immediately before the coating process.

What is claimed is:

1. A method of manufacturing an electric motor comprising the steps of:
   forming a generally tubular metallic housing case;
   inserting arc-shaped magnets within said case and radially spaced therefrom by points of adhesive material;
   applying a coating material to said case; and
   heating said case and magnets sufficiently to simultaneously set said coating material and adhesive.

2. The method of claim 1, wherein said step of heating comprises induction heating.

3. The method of claim 1, further comprising the step of inserting resilient spacers circumferentially with said magnets, said spacer configured to simultaneously circumferentially space said magnets from adjacent magnets and radially bias said magnet toward said housing case.

4. A method for manufacturing an electric motor comprising the steps of:
   inserting arc-shaped magnets into a metallic housing;
   positioning said magnets adjacent an inside wall of said housing;

placing a melting adhesive between said magnets and said housing;

coating a settable coating material onto said housing; and supplying heat to said housing and magnets to simultaneously (1) harden said adhesive, thereby connecting said magnets and said housing via said adhesive, and (2) set said coating material to form a housing cover.

5. A method according to claim 4, comprising the further steps of:

punching recesses into a metal blank for receiving said melting adhesive; and bending said metal blank to form said housing, said recesses forming part of said inside wall of said housing.

6. A method according to claim 4, further comprising the step of applying said adhesive to said magnets before inserting said magnets into said housing.

7. A method according to claim 4, further comprising the steps of:

holding said magnets in position with position securing means; and supporting said magnets via said adhesive on said inside of said housing.

8. A method according to claim 7, further comprising the steps of:

arranging at least one resilient clamp, acting as said position securing means, in a circumferential direction between said magnets; and urging said magnets via said clamp in a radial direction toward said inside wall of housing.

9. A method according to claim 8, further comprising the steps of:

assembling said clamp between said magnets without any rivets;

engaging securing tabs of said clamp into an area between said magnets and said inside wall of said housing; and fixing said magnets in an axial direction via stops formed on the front sides of said clamp.

10. A method according to claim 7, further comprising the steps of:

inserting a removable expanding device, acting as said position securing means, into said housing; and urging said magnets in a radial direction towards said inside wall of said housing.

11. A method according to claim 4, further comprising the step of washing said housing after inserting said magnets into said housing and before coating said housing.

* * * * *